US006620897B1

(12) United States Patent
Smillie

(10) Patent No.: US 6,620,897 B1
(45) Date of Patent: Sep. 16, 2003

(54) HEAT-SEALABLE POLYOLEFINS AND ARTICLES MADE THEREFROM

(75) Inventor: Benjamin Andrew Smillie, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 373 days.

(21) Appl. No.: 09/655,106

(22) Filed: Sep. 6, 2000

Related U.S. Application Data

(60) Provisional application No. 60/152,701, filed on Sep. 7, 1999.

(51) Int. Cl.[7] ............................ C08F 4/44; B32B 27/32; C08L 23/04
(52) U.S. Cl. ...................... 526/171; 526/172; 525/240; 502/155; 428/513
(58) Field of Search ........................ 525/240; 526/160, 526/161, 171, 172; 502/152, 155; 428/513

(56) References Cited

U.S. PATENT DOCUMENTS

| 5,358,792 | A | 10/1994 | Mehta et al. |
| 5,372,882 | A | 12/1994 | Peiffer et al. |
| 5,427,807 | A | 6/1995 | Chum et al. |
| 5,462,807 | A | 10/1995 | Halle et al. |
| 5,530,065 | A | 6/1996 | Farley et al. |
| 5,587,247 | A | 12/1996 | Kubo et al. |
| 5,714,556 | A | 2/1998 | Johnson et al. |
| 5,741,861 | A | 4/1998 | Yamamoto et al. |
| 5,770,318 | A | 6/1998 | Friedman |
| 5,773,106 | A | 6/1998 | deGroot et al. |
| 5,773,129 | A | 6/1998 | Wakamatsu et al. |
| 5,792,549 | A | 8/1998 | Wilkie |
| 5,866,663 | A | 2/1999 | Brookhart et al. |
| 5,874,139 | A | 2/1999 | Bosiers et al. |
| 5,895,803 | A | 4/1999 | Deblauwe et al. |
| 6,060,569 | A | 5/2000 | Bennett et al. |
| 6,310,167 | B1 * | 10/2001 | Kanzawa et al. ........... 526/352 |

FOREIGN PATENT DOCUMENTS

| EP | 0 590 739 | 4/1994 | |
| EP | 924062 A2 * | 6/1999 | ........... B32B/27/08 |
| EP | 0 985 687 | 3/2000 | |
| WO | WO 93 03093 | 2/1993 | |
| WO | WO 95/32235 * | 11/1995 | |
| WO | WO 97 28960 | 8/1997 | |
| WO | WO 98/27124 * | 6/1998 | |
| WO | WO 98 42665 | 10/1998 | |
| WO | WO 98 47934 | 10/1998 | |
| WO | WO 99/05189 * | 2/1999 | |
| WO | WO 99 06476 | 2/1999 | |

OTHER PUBLICATIONS

Denger, et al., *Simultaneous oligomerization and polymerization of ethylene*, Makromol. Chem., Rapid Commun., 1991, p. 697–701, vol. 12.

Benham, E. A. et al., *A Process for the Simultaneous Oligomerization and Copolymerization of Ethylene*, Polymer Engeineering and Science, 1988, p. 1469–1472, vol. 28, No. 22.

* cited by examiner

Primary Examiner—Robert D. Harlan

(57) ABSTRACT

Polyolefins, preferably polyethylene, having a density of about 0.86 to about 0.93 g/mL, and having methyl branches and at least branches of two other different lengths of six carbon atoms or less, form heat seals at exceptionally low temperatures, thereby allowing good seals to be formed rapidly. This is advantageous when heat sealing these polyolefins, for example in the form of single or multilayer films.

10 Claims, No Drawings

HEAT-SEALABLE POLYOLEFINS AND ARTICLES MADE THEREFROM

CROSS-REFERENCE TO RELATED APPLICATION

This application claims priority under 35 U.S.C. §119 from U.S. Provisional Application Ser. No. 60/152,701 (filed Sep. 7, 1999), which is incorporated by reference herein as if fully set forth.

FIELD OF THE INVENTION

Polyolefins, preferably polyethylene, having a density of about 0.86 to about 0.93 g/mL, and having methyl branches and at least 2 other different lengths of branches of 6 carbon atoms and less, form heat seals at exceptionally low temperatures, thereby allowing good seals to be formed rapidly. This is advantageous when heat sealing so-called flexible packaging made from single or multilayer films.

TECHNICAL BACKGROUND

Polyolefins such as polyethylene and polypropylene have been used in many applications, for example in packaging such as bags and cartons. In many instances in order to form the package it is necessary to effect a seal between two different pieces or two different parts made of the same polyolefin. This may be done using adhesives, but is more commonly done by applying heat to the surfaces to be joined to soften or melt them while applying some pressure to the place where they are to be joined to form a single piece of thermoplastic. This operation is called heat sealing, and is commonly used to join thermoplastic parts. See for instance K. R. Osborn, et al., *Plastic Films*, Technomic Publishing Co., Inc., Lancaster, Pa., U.S.A., 1992, especially p. 152–153 and 173–175; H. Mark, et al., Ed., *Encyclopedia of Polymer Science and Engineering*, Vol. 1, McGraw Hill Book Co., New York, 1985, p. 527; and ibid., Vol. 7, 1987, p.117.

Most commonly the heating is carried out by contacting the surfaces opposite those to be joined with a hot object such as a hot bar, or heating the surfaces with hot air or infrared radiation. In any event the speed at which one can heat the surfaces to be joined to the proper temperature for joining often determines the speed at which one can heat seal the surfaces. This is particularly true for thermoplastics such as polyolefins, because they often have relatively low thermal conductivities. High speed heat sealing is important because many such operations are high volume continuous operations where slow heat sealing speeds significantly increase costs.

One way to increase heat sealing speeds is to lower the temperature at which the seal may be formed. This is typically done by lowering the melting point of the polymer being sealed, but has its limits since if the melting point of the polymer is lowered too much the seal itself may be too weak or the polymer characteristics may be detrimentally affected. Therefore ways of forming satisfactory seals at lower temperatures are constantly being sought.

Numerous attempts have been made to find polymers with improved heat sealing properties, see for instance U.S. Pat. No. 5,358,792, U.S. Pat. No. 5,372,882, U.S. Pat. No. 5,427,807, U.S. Pat. No. 5,462,807, U.S. Pat. No. 5,530,065, U.S. Pat. No. 5,587,247, U.S. Pat. No. 5,741,861, U.S. Pat. No. 5,770,318, U.S. Pat. No. 5,773,106, U.S. Pat. No. 5,773,129, U.S. Pat. No. 5,792,549, WO9303093, WO9532235 and WO9728960. None of these references uses the polymers described herein.

WO9827124, WO9847934, WO9905189, U.S. Pat. No. 5,714,556 and U.S. Pat. No. 5,866,663 and U.S. Pat. No. 6,060,569 (all of which are incorporated by reference herein for all purposes as if fully set forth) describe generally certain branched polyolefins, and their uses. The specific polymers used herein are not particularly noted in these publications for use in heat sealing applications.

SUMMARY OF THE INVENTION

This invention concerns a process for lowering the heat sealing temperature of a polyolefin-based thermoplastic, comprising the step of replacing at least a portion of the polyolefin in the thermoplastic with a branched polyolefin having a density of about 0.86 to about 0.93 g/mL, and having methyl branches and at least branches of two other different lengths of six carbon atoms or less, provided that said methyl branches are at least 10 mole percent of total branching in said branched polyolefin.

This invention further concerns a first article having a first thermoplastic surface suitable for heat sealing to a second thermoplastic surface of the same or another article, wherein said first thermoplastic surface comprises a branched polyolefin having a density of about 0.86 to about 0.93 g/mL, having methyl branches and at least branches of two other different lengths of six carbon atoms or less, provided that said methyl branches are at least 10 mole percent of total branching in said branched polyolefin.

The invention still further concerns a process for preparing an article comprising the step of heat sealing a first thermoplastic surface to a second thermoplastic surface, wherein the first thermoplastic surface and the second thermoplastic surface comprise a branched polyolefin having a density of about 0.86 to about 0.93 g/mL, having methyl branches and at least branches of two other different lengths of six carbon atoms or less, provided that said methyl branches are at least 10 mole percent of total branching in said branched polyolefin.

This invention also concerns an article made at least in part from a first thermoplastic surface and a second thermoplastic surface joined together by heat sealing, wherein the first thermoplastic surface and a second thermoplastic surface comprise a branched polyolefin having a density of about 0.86 to about 0.93 g/mL, having methyl branches and at least branches of two other different lengths of six carbon atoms or less, provided that said methyl branches are at least 10 mole percent of total branching in said polyolefin.

DETAILED DESCRIPTION OF THE PREFERRED EMBODIMENTS

The polymers used herein are hydrocarbon polyolefins, that is polymers made by the addition polymerization of olefinic bonds of one or more hydrocarbon olefins. Preferably the polymers are made from one or more monomers (olefins) of the formula $R^1HC=CHR^2$, wherein $R^1$ and $R^2$ are each independently hydrogen or alkyl; more preferably wherein one of $R^1$ or $R^2$ is hydrogen, and the other is hydrogen or n-alkyl, and especially wherein both $R^1$ and $R^2$ are hydrogen (the olefin is ethylene). A specific preferred polymer is polyethylene, that is a polymer containing about 80 mole percent or more of repeat units derived from ethylene, and another specifically preferred polymer is homopolyethylene, which contains about 98 mole percent or more of repeat units derived from ethylene.

The polymers useful herein are obtainable (and preferably obtained) by polymerizing olefins in the presence of a catalyst component comprising a late transition metal catalyst such as, for example, disclosed in previously incorporated WO9827124, WO9847934, WO9905189, U.S. Pat. No. 5,714,556, U.S. Pat. No. 5,866,663 and U.S. Pat. No. 6,060,569, as well as U.S. Pat. No. 5,852,145, U.S. Pat. No. 5,880,241, U.S. Pat. No. 5,932,670, U.S. Pat. No. 5,942,461, WO98/30612, WO98/37110, WO98/40374, WO98/40420, WO98/42664, WO98/42665, WO98/47933, WO98/47934, WO99/30609, WO99/49969, WO99/41290 and WO99/62968 (all of which are also incorporated by reference herein for all purposes as if fully set forth). Preferably, the polymers are made by polymerizing an olefin component comprising a predominant amount of ethylene, in the presence of a catalyst component comprising a late transition metal complex (more preferably wherein the late transition metal is Ni or Pd) of a diimine ligand. One such preferred late transition metal complex is set forth in the examples appended hereto. The catalyst component may also optionally contain various suitable catalyst activators and co-catalysts. Further details regarding the catalyst component may be had by reference to the previously incorporated publications.

Although any type of polymerization process, gas phase, slurry, or solution, continuous, batch or semibatch, may be used to prepare the branched polyolefins suitable for use herein, because of the relatively low melting point of these polyolefins, it is preferred to make them in a solution or slurry process, more preferably a solution process.

The branched polyolefins have a density of about 0.86 to about 0.93 g/mL, preferably about 0.86 to about 0.91 g/mL, and especially about 0.88 to about 0.90 g/mL, at 23° C. The density, as is usually done, is measured on solid polymer without filler or other materials (except for normal small amounts of antioxidants) using the method of ASTM D1505.

Consistent with the requirements for density and as otherwise set forth above, the polyolefins utilized in accordance with the present invention contain at least some branching. Measurement (usually by $^{13}C$ NMR) and calculation of branching levels in these polymers is described in the previously incorporated publications, and reference may be had thereto for further details.

These polymers have branches of at least three different lengths containing 6 carbon atoms or less, or in other words at least any three of methyl, ethyl, n-propyl, n-butyl, n-amyl and n-hexyl. Usually n-hexyl is lumped together as hexyl+, meaning n-hexyl plus any other longer branches. For the purposes herein n-hexyl means hexyl+ also (for branches longer than ethyl the "n-" may be omitted), and all hexyl+ branches are considered to contain 6 carbon atoms. It is preferred that that at least four different branch lengths containing six or fewer carbon atoms be present.

Some of the polymers suitable for use in accordance with the present invention, and prepared in accordance with the previously incorporated references, have unusual branching, i.e., they have more or fewer branches than would be expected for "normal" coordination polymerizations, or the distribution of sizes of the branches is different from that expected, and "branches on branches" may also present. By this is meant that a branch from the main chain on the polymer may itself contain one or more branches. It is also noted that the concept of a "main chain" may be a somewhat semantic argument if there are sufficient branches on branches in any particular polymer. Thus, a "branch" hereunder refers to a methyl group connected to a methine or quaternary carbon atom, or a group of consecutive methylenes terminated at one end by a methyl group and connected at the other end to a methine or quaternary carbon atom. The length of the branch is defined as the number of carbons from and including the methyl group to the nearest methine or quaternary carbon atom, but not including the methine or quaternary carbon atom. If the number of consecutive methylene groups is "n" then the branch contains (or the branch length is) n+1. Thus the structure (which represents part of a polymer)

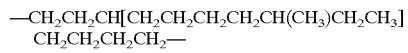

contains 2 branches, a methyl and an ethyl branch.

At least about 10 mole percent of the branches in the polymer, preferably at least about 25 mole percent, more preferably at least about 60 mole percent, are methyl branches. By this is meant that the total length of the branch (as defined above) from the nearest branch point is one carbon atom. In this calculation, ends of chains are excluded (corrected for), using the number average molecular weight determined by Gel Permeation Chromatography, using a suitable standard (calibration by light scattering is preferred). It is also preferred that the polymer have (in combination with the above) one or more of: at least about 10 mole percent, more preferably at least about 15 mole percent of the branches are ethyl; at least about 3 mole percent, more preferably at least about 5 mole percent of the branches are propyl; at least about 3 mole percent, more preferably at least about 5 mole percent of the branches are butyl; at least about 2 mole percent, more preferably at least about 4 mole percent of the branches are amyl; and/or at least about 3 mole percent, more preferably at least about 5 mole percent of the branches are hexyl+.

In one preferred embodiment, the polymer contains about 30 to about 150 branches per 1000 methylene groups, and which contains for every 100 branches that are methyl, about 30 to about 90 ethyl branches, about 4 to about 20 propyl branches, about 15 to about 50 butyl branches, about 3 to about 15 amyl branches, and about 30 to about 140 hexyl+ branches.

In another preferred embodiment, the polymer contains about 20 to about 150 branches per 1000 methylene groups, and which contains for every 100 branches that are methyl, about 4 to about 20 ethyl branches, about 1 to about 12 propyl branches, about 1 to about 12 butyl branches, about 1 to about 10 amyl branches, and 0 to about 20 hexyl+ branches.

It is further preferred that the branched polyolefins are polyethylenes, more preferably homopolyethylenes.

Another preferred embodiment is a homopolyethylene containing the structure (XXVII) in an amount greater than can be accounted for by end groups.

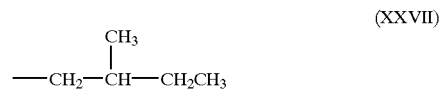

(XXVII)

More preferably this homopolyethylene contains about 2 or more of (XXVII) per 1000 methylene groups.

In accordance with one aspect of the present invention, the heat sealing temperature of a polyolefin-based thermoplastic can be lowered by replacing at least a portion of the polyolefin in the thermoplastic with the branched polyolefin as described above. The branched polyolefin can simply be used in place of the original polyolefin, or can be blended in various proportions with the original polyolefin in order to replace a portion of the same. Such a blend can be a standard physical blend, melt blend, or even a reactor blend prepared by polymerizing the desired olefins in the presence of the catalyst composition referred to above, along with a second active polymerization catalyst (a co-catalyst) such as a Ziegler-Natta and/or metallocene-type catalyst known in the art, used to prepare the original polyolefin. See, for example, U.S. Pat. No. 6,114,483, WO97/48735, WO97/38024 and WO98/38228 (all of which are also incorporated by reference herein for all purposes as if fully set forth).

The resulting thermoplastic can be used to form articles with surfaces possessing a lower heat sealing temperature and, thus, improved processibility.

In preparing articles by heat sealing thermoplastic surfaces, it is preferred that all of the respective surfaces comprise the branched polyolefin as described herein. More preferably, the various surfaces are made essentially only with the branched polyolefins described above as the thermoplastic polymer, still more preferably from such branched polyolefins prepared from the same monomer(s), and especially when each of the surfaces is the same polymer. Of course, in addition to the branched polyolefins (and other thermoplastic polymer components), the surfaces can contain other additives and adjuvants commonly found in heat sealing thermoplastics such as, for example, antioxidants and stabilizers, colorants, processing aids and the like.

More than two surfaces may be sealed together, for example three films may be sealed together, and preferably all of the surfaces being sealed are of the same branched polymer as described herein.

Heat sealing may be done by any variety of methods well known to those skilled in the art. See for instance *Plastic Films*, Technomic Publishing Co., Inc., Lancaster, Pa., U.S.A., 1992, especially p. 152–153 and 173–175. Preferably the heating of the areas to be sealed is done by thermal conduction from a hotter material (e.g., sealing bar(s) or roller(s)), by microwave heating, dielectric heating, and ultrasonic heating. The amount of pressure used may vary from that needed to contact the two (or more) surfaces to be sealed, for example finger pressure to pressure applied by presses or rollers, for example up to 700 kPa (100 psi). The heating may be before, or simultaneous with the application of pressure. Although pressure may be applied before heating, it will normally not be effective until the heating is carried out. Generally speaking, the temperatures of the polyolefin surface that is being sealed will be about 50° C. to about 110° C. This temperature will depend to some extent on the amount of pressure used, higher pressures allowing lower temperatures, since higher pressures cause more intimate contact between sealing surfaces. It also depends on the polyolefin of the heat-sealing surface, and those with lower densities will usually have lower sealing temperatures. Since much of the heat sealing done commercially is on high speed lines, the lower the temperature needed to give a seal of sufficient strength, the faster the line may often run, since it will take less time to heat the sealing surfaces to the required temperature.

The materials which may be heat sealed are any whose surface to be heat sealed is of the polyolefins used herein. Useful materials which may be heat sealed include single and multilayer films, polyolefin coated paper or paperboard, polyolefin coated metal foil (which can be considered a multilayer film), polyolefin coated articles made by injection or blow molding, polyolefin injection or blow molded articles, rotationally molded parts. Preferred materials for heat sealing are single and multilayer blown and/or oriented films and sheet, coated paper and paperboard, and single and multilayer films are especially preferred. A single layer film will simply be a layer of the polyolefins described herein. A multilayer film will have two or more layers, and one or both of the surface layers will be a polyolefin described herein. For example other layers may be present for the purposes of increased barrier properties to one or more materials, for added strength and/or toughness, for decorative purposes (for example to have been or be printed on), adhesive layers to improve adhesion between other layers, or any combination of these. These other layers may be polymers such as polyolefins, polyesters, polyamides, polycarbonates, acrylics, or mixtures of these, paper, and metal (foil).

The present process is particularly useful to form packages, which are also particularly useful articles. By a "package" is meant any container that is meant to be sealed most of the time (sometimes called "protective packaging"), especially before the contents are used, against ambient conditions such as air and/or moisture, and/or loss of the package's content as by evaporation. The package may be designed so that the seal against ambient conditions may be broken permanently broken as by cutting or tearing to open a sealed bag. The package may have one or more inlets and/or outlets to store a material that may be added to and/or withdrawn from the package without further opening the package. These packages are preferably made from single or multilayer films, especially multilayer films, in which the present polyolefins are at least the "sealing layer" that is the layer that forms a heat seal. These include flexible bags which are sealed, such as solid or liquid food containers, intravenous bags, pouches, and dry food containers (cereal and cracker liners in boxes).

In the Examples, the following tests were used:

Tensile properties, ASTM D882, Method A (MD is machine direction, TD is transverse direction).

Film density by ASTM D1505.

$I_2$ and $I_{10}$ by ASTM D1238.

Elmendorf Tear by ASTM D1922

Heat seals were formed by ASTM F88, using a 12.5 μm (0.5 mil) Mylar® film slip sheet, 138 kPa (20 psi) sealing pressure, a 0.64 cm (0.25") wide sealing bar, and a 0.25 sec dwell. The heat seal strengths were measured on an SP-102C-3m90 Slip/Peel tester supplied by IMASS, Inc., Box 134, Accord, Mass., 02018, U.S.A., at a 25.4 cm/min (10"/min) crosshead speed.

The commercial polyolefins, all believed made with metallocene-type catalysts, used in the Comparative Examples were obtained as follows:

Exact® 3128, and Exact® 4033 are reportedly ethylene/1-butene copolymers obtained from Exxon Chemical Corp., Houston, Tex. 77252 U.S.A.

Exact® 3132 and Exact® SLP 9095 are reported to be ethylene/1-hexene copolymers, obtained from Exxon Chemical Corp.

Affinity® PL 1880 is reported to be an ethylene/1-octene copolymer, obtained from Dow Chemical Co., Inc., Midland, Mich. U.S.A.

EXAMPLES 1–2

General Polymerization Procedure

The solution polymerization system used for this work was a semi-batch tank reactor, and consisted of an 8-L (16.4 cm I.D.×36.7 cm high) vertical stirred stainless steel reactor, gas purification systems, solvent purification systems, an online mass flow rate detector to measure ethylene feed rate, and an online GC measurement system to analyze the head space composition in the reactor. The reactor was equipped with an agitator, an internal coil and a jacket in which circulated a mixture of steam and water. The reactor could be operated in a temperature range of 20 to 115° C. by adjusting steam and water flows in the internal coil and jacket. Process temperature, pressure, and mass flow rate of ethylene were measured and recorded online. Research grade ethylene monomer was further purified by passing specially designed moisture and oxygen traps to remove residual impurities. Ultra high purity nitrogen/argon were further purified by passing through their own series of two gas dryers, one carbon dioxide absorber, and one oxygen trap. High purity solvent was further dried by passing three specially designed purification columns before added into the reactor.

The following materials were used for the solution ethylene polymerizations:

Ethylene monomer (research grade, 99.999 mol. %, Matheson Gas Products Canada, Inc., Whitby, ON Canada);

Nitrogen (ultra high purity, 99.999 mol%, Praxair Canada, Inc., Belleville, ON Canada);

Argon (ultra high purity, 99.999 mol%, Praxair Canada, Inc.);

Toluene (99.9 wt %, anhydrous, Sigma-Aldrich Canada Ltd., Mississauga, ON Canada);

Modified Methylaluminoxane (MMAO-3A) (6.99 wt % of Al in toluene, Akzo Nobel Chemical Inc., Chicago, Ill. U.S.A.);

Cyclohexane (Pure grade, 99.94 wt %, Phillips Chemical Company, Bartlesville, Okla. U.S.A.).

The nickel compound used in the catalyst system had the formula as shown below:

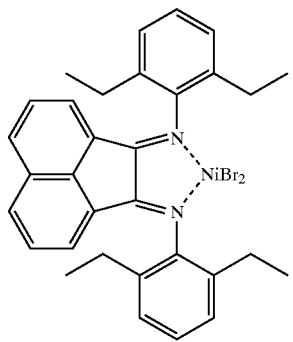

The following preparation steps were taken prior to polymerization:

Toluene was distilled in the presence of metallic sodium and benzophenone.

Catalyst was dissolved in the dried toluene.

Reactor body was dried at 115° C. for over one hour under vacuum then purged using dried argon.

Unless otherwise noted, all pressures are gauge pressures.

Typically, an amount of pre-dried solvent (5.0 l was added into the reactor under a reactor sealed condition. The reactor was heated up to a desired polymerization temperature. Modified methylaluminoxane (Al/Ni of 500–900) as a scavenger was injected into the reactor and the contents in the reactor were mixed with an agitation speed of 400 rpm for 15 min. Ethylene was injected into the reactor to presaturate the solvent at a pressure of 1.0 MPa.

Nickel compound (2–20 mg) with 50 ml of solvent (toluene) was mixed with modified methylaluminoxane (Al/Ni: 500–1000) for 5 min and was injected into the reactor using ethylene. An additional 100 ml of cyclohexane was used to wash any catalyst residuals in the catalyst charging port. The reactor pressure was adjusted to a desired pressure level by regulating ethylene flow rate. Ethylene was continuously charged into the reactor under agitation. Ethylene mass feed rate was recorded online. Temperature and pressure were maintained at a constant level for a given polymerization time (1 to 3 h).

At the end of polymerization, the residual ethylene in the reactor was vented off after ethylene supply had been shut off. The reactor pressure was reduced to 0 Pa. The residual catalyst was deactivated by adding a small amount of methanol into the polymer solution.

The polyethylene was separated from the solution by evaporating the solvent under a nitrogen purge. The resulting polymer was dried at 60° C. in a vacuum oven over 24 h to remove any residual solvent.

The polymerization conditions for the examples in Table 1 are as follows:

| | |
|---|---|
| Cyclohexane: | 5.0 l |
| Nickel compound: | 20.0 mg |
| Al/Ni ratio: | 1000 |
| Reactor pressure: | 1.38 MPa |
| Temperature: | 65° C. |

For the polymer of Example 1, 8 separate polymerizations were run, and the products combined into a single polymer batch. Polymerization times were 1–3 h, and ethylene pressure was 1.0 MPa.

For the polymer of Example 2, 4 separate polymerization runs were made, similar to those for Example 1, except for 3 of those runs the solvent was isooctane and for the fourth cyclohexane, the temperature was 60–65° C., and the ethylene pressure was 1.4–1.7 MPa. The products of all 4 polymerization runs were combined into a single batch of polymer.

For Example 1, the polymer from each of the 8 polymerization runs was cut into strips and extruded through a 1.9 cm (0.75") Killion single screw extruder and cut into pellets. The pellets from all 8 polymerization runs were then blended together and mixed with 500 ppm of Irgafos® 168 and 500 ppm of Irganox® 1076 antioxidants (Ciba-Geigy Corp.), and the entire batch extruded through the same extruder and formed into pellets. For all of these extrusions, the rear zone was 180° C., all the other zones 190° C., and screw rpm was 60 for the individual batches and 75 for the combined batch.

For Example 2, the polymer from each of the 4 polymerization runs was cut into strips and extruded through a 1.9 cm (0.75") Killion single screw extruder and cut into pellets. The pellets from all 4 polymerization runs were then blended together and mixed with 500 ppm of Irgafos® 168 and 500 ppm of Irganox® 1076 antioxidants (Ciba-Geigy Corp.), and the entire batch extruded through the same extruder and formed into pellets. For individual batch extrusions, the rear zone was 170° C., all the other zones 180° C., and screw rpm was 61.5, and for the single combined batch the rear zone was 180° C., all the other zones 190° C., and the screw rpm was 50.

EXAMPLE 3 AND COMPARATIVE EXAMPLES A–D

The polyethylene of Example 1 and three commercial copolymers of ethylene and an alpha-olefin were extruded through a blown film die, and wound up. The extruder was a 1.7 cm (0.75") diameter Killion 30/1 L/D single screw extruder fitted with a 2.5 cm (1") diameter Killion blown film die and a Future Design Saturn® mini air ring. The rear zone was 180° C., the other barrel zones 200° C., the adapter 220° C., and the die zones 190–200° C., and the screw rpm 60. The film gage was nominally 50 μm (2 mil), the layflat dimension was 12.1 cm (4.75"), and blow-up ratio 3:1. Frostline heights are given in Table 1. Table 1 also lists heat seal strengths and densities for the various polymers.

TABLE 1

| Example | 3 | A | B | C |
|---|---|---|---|---|
| Polymer | Ex. 1 | Exact ® 3132 | Exact ® 4033 | Exact ® SLP9095 |
| Frost Line (cm) | 12.1 | 15.9 | 14.0 | 12.7 |
| Film Density, 9/ml | 0.889 | 0.903 | 0.885 | 0.886 |
| Thickness, μm | 50.5 | 53.3 | 55.9 | 53.3 |
| Heat Seal Strengths, gm/1.27 cm | | | | |
| 60° C. | 0 | | | |
| 65° C. | 121 | | | 0 |
| 70° C. | 302 | | | 11 |
| 75° C. | 325 | | 0 | 227 |
| 80° C. | 290 | | 203 | 313 |
| 85° C. | 317 | | 265 | 307 |
| 90° C. | 336 | 0 | 241 | 348 |
| 95° C. | 273 | 450 | 235 | 284 |
| 100° C. | 303 | 504 | 245 | 339 |
| 105° C. | 307 | 464 | 252 | 320 |
| 110° C. | 299 | 439 | 252 | 363 |

EXAMPLE 4 AND COMPARATIVE EXAMPLES D–G

The polyethylene of Example 2 and four commercial copolymers of ethylene and an alpha-olefin were extruded through a blown film die, and wound up. Extrusion conditions were the same as in Example 3, except the layflat was 13.3 cm for Example 4 and 12.7 cm for Comparative Examples D–G. Frostline, density, thickness and heat seal strengths are given in Table 2, and other physical properties are given in Table 3.

TABLE 2

| Example | 4 | D | E | F | G |
|---|---|---|---|---|---|
| Polymer | Ex. 2 | Exact ® 3128 | Exact ® 3132 | Affinity ® PL1880 | Exact ® 4033 |
| Frost Line | 16.5 | 12.7 | 15.2 | 13.3 | 15.9 |
| Film Density g/ml | 0.895 | 0.903 | 0.903 | 0.905 | 0.886 |
| Heat Seal Strengths, gm/1.27 cm | | | | | |
| 70° C. | 0 | | | | |
| 75° C. | 60 | | | | 0 |
| 80° C. | 296 | | | | 180 |
| 85° C. | 354 | | | | 276 |
| 90° C. | 368 | | | | 292 |
| 95° C. | 391 | 10 | 0 | 0 | 295 |
| 100° C. | 350 | 242 | 98 | 52 | 332 |
| 105° C. | 341 | 525 | 443 | 365 | 310 |
| 110° C. | 360 | 533 | 568 | 523 | 311 |
| 115° C. | 358 | 485 | 590 | 571 | 274 |
| 120° C. | 365 | 531 | 590 | 541 | 273 |

TABLE 3

| | Example | | | | |
|---|---|---|---|---|---|
| | 4 | D | E | F | G |
| Polymer | Ex. 2 | Exact ® 3128 | Exact ® 3132 | Affinity ® PL1880 | Exact ® 4033 |
| $I_2$ | 0.940 | 1.140 | 1.180 | 1.030 | 0.800 |
| $I_{10}$ | 6.210 | 6.600 | 6.920 | 8.770 | 4.450 |
| $I_{10}/I_2$ | 6.6 | 5.8 | 5.9 | 8.5 | 5.6 |
| Tensile Properties | | | | | |
| MD | | | | | |
| Tensile Strength MPa | 42.0 | 43.1 | 47.3 | 43.8 | 49.2 |
| Elong. Break, % | 817 | 892 | 856 | 840 | 834 |
| 1% Secant Mod., MPa | 21.6 | 52.9 | 57.7 | 64.4 | 16.7 |
| TD | | | | | |
| Tensile Strength Mpa | 43.3 | 38.4 | 48.5 | 37.0 | 41.4 |
| Elong. Break, % | 795 | 861 | 865 | 807 | 720 |
| 1% Secant Mod., MPa | 20.6 | 50.3 | 59.2 | 61.9 | 15.7 |
| Elmendorf, g/25 μm | | | | | |
| MD | 93.8 | 144.6 | 193.4 | 262.7 | 40.9 |
| TD | 107.6 | 171.0 | 233.1 | 263.9 | 25.1 |

Table 4 lists the branching levels of various polymers used in the Examples, as determined by $^{13}C$ NMR. In Table 4, EOC is ends-of-chains. Total methyl indicates the total number of branches plus EOC, while methyl indicates the amount of actual methyl branches, both as defined herein.

TABLE 4

| | Branching per 1000 $CH_2$'s | | | | | | |
|---|---|---|---|---|---|---|---|
| Polymer | Total Methyl | Methyl | Ethyl | Propyl | Butyl | Amyl | Hex + and EOC |
| Example 2 | 59.4 | 37.2 | 6.3 | 3.4 | 2.9 | 1.7 | 5.8 |
| Example 1 | 60.8 | 41.0 | 5.6 | 2.7 | 2.8 | 1.8 | 6.4 |
| Exact ® 4033 (film) | 54.0 | 0.0 | 54.0 | 0.0 | 0.0 | 0.0 | 0.0 |
| Exact ® SLP 9095 (film) | 43.1 | 0.0 | 2.5 | 0.0 | 39.2 | 0.0 | 0.8 |

Table 5 lists the results of hot tack tests on various polymers. The test used was the "Packforsk" test, using a pressure of 280 kPa (40 psi) and a dwell time of 3 sec. This test is described in A. M. Soutar, Journal of Plastic Film and sheeting, Vol. 12, p. 304–334.

TABLE 5

| | Strength, N/cm | | |
|---|---|---|---|
| Polymer | Ex. 1 | Ex. 2 | Exact ® 4033 |
| Temp., ° C. | | | |
| 80 | 1.6 | 3.0 | 4.7 |
| 90 | 5.2 | 2.6 | 3.9 |
| 100 | 5.4 | 2.5 | 3.3 |
| 120 | 4.1 | 3.0 | 3.9 |
| 140 | 5.1 | 3.0 | 5.0 |
| 160 | 4.8 | 3.0 | 4.0 |

TABLE 5-continued

| | Strength, N/cm | | |
|---|---|---|---|
| Polymer | Ex. 1 | Ex. 2 | Exact ® 4033 |
| 180 | 5.1 | 2.9 | 4.5 |
| 200 | 4.0 | 2.3 | 4.3 |
| 220 | 4.1 | 2.0 | 3.3 |

What is claimed is:

1. A first article having a first thermoplastic surface suitable for heat sealing to a second thermoplastic surface of the same or another article, wherein said first thermoplastic surface comprises a branched polyolefin having a density of about 0.86 to about 0.93 g/mL, having methyl branches and at least branches of two other different lengths of six carbon atoms or less, provided that said methyl branches are at least 10 mole percent of total branching in said branched polyolefin.

2. The first article as recited in claim 1, wherein the branched olefin is obtainable by polymerizing an olefin in the presence of a catalyst component comprising a late transition metal catalyst.

3. The first article as recited in claim 1, wherein the first article is a film.

4. The first article as recited in claim 1, wherein the branched polyolefin has a density of about 0.86 to about 0.91 g/mL.

5. The first article as recited in claim 1, wherein said branched polyolefin is a homopolyethylene.

6. An article made at least in part from a first thermoplastic surface and a second thermoplastic surface joined together by heat sealing, wherein the first thermoplastic surface and a second thermoplastic surface comprise a branched polyolefin having a density of about 0.86 to about 0.93 g/mL, having methyl branches and at least branches of two other different lengths of six carbon atoms or less, provided that said methyl branches are at least 10 mole percent of total branching in said polyolefin.

7. The article as recited in claim 6, wherein the branched olefin is obtainable by polymerizing an olefin in the presence of a catalyst component comprising a late transition metal catalyst.

8. The article as recited in claim 6, wherein the article is a single or multilayer film.

9. The article as recited in claim 6, wherein the branched polyolefin has a density of about 0.86 to about 0.91 g/mL.

10. The article as recited in claim 6, wherein said branched polyolefin is a homopolyethylene.

* * * * *